(12) United States Patent
Kamada et al.

(10) Patent No.: US 11,835,687 B2
(45) Date of Patent: Dec. 5, 2023

(54) IMAGING LENS

(71) Applicant: TOKYO VISIONARY OPTICS CO., LTD., Tokyo (JP)

(72) Inventors: Kenichi Kamada, Sukagawa (JP); Masaya Hashimoto, Sakagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 287 days.

(21) Appl. No.: 17/088,077

(22) Filed: Nov. 3, 2020

(65) Prior Publication Data
US 2021/0382275 A1     Dec. 9, 2021

Related U.S. Application Data

(63) Continuation of application No. 16/744,798, filed on Jan. 16, 2020, now abandoned.

(30) Foreign Application Priority Data

Jan. 17, 2019   (JP) ................. 2019-006312

(51) Int. Cl.
*G02B 13/00*     (2006.01)
*G02B 9/62*      (2006.01)
*G02B 27/00*     (2006.01)

(52) U.S. Cl.
CPC ......... *G02B 13/0045* (2013.01); *G02B 9/62* (2013.01); *G02B 27/0025* (2013.01)

(58) Field of Classification Search
CPC .... G02B 13/18; G02B 13/16; G02B 13/0015; G02B 13/0045; G02B 27/0172; G02B 27/0012; G02B 27/0025; G02B 15/146; G02B 9/62; G02B 9/64; H04N 5/2254; H04N 5/222

USPC ......... 359/656–658, 708, 713, 749, 756–762
See application file for complete search history.

(56) References Cited

U.S. PATENT DOCUMENTS 10,095,007 B1   10/2018   Jhang et al.
2018/0059377 A1*  3/2018   Fukaya ............. G02B 27/0025

FOREIGN PATENT DOCUMENTS

CN           107450157 A      12/2017

* cited by examiner

*Primary Examiner* — Travis S Fissel
(74) *Attorney, Agent, or Firm* — Hamre, Schumann, Mueller & Larson, P.C.

(57) ABSTRACT

There is provided an imaging lens with excellent optical characteristics which satisfies demand of a low profile and a low F-number. An imaging lens comprises in order from an object side to an image side,
a first lens with positive refractive power having a convex object-side surface in a paraxial region, a second lens with negative refractive power having a concave image-side surface in a paraxial region, a third lens having a convex object-side surface in a paraxial region, a fourth lens having a convex image-side surface in a paraxial region, a fifth lens having a convex object-side surface in a paraxial region, and a sixth lens having a concave image-side surface in a paraxial region, wherein three out of four lenses from the third lens to the sixth lens have positive refractive power or negative refractive power in the paraxial region, and one out of four lenses is formed in a meniscus shape, substantially has no refractive power in the paraxial region, and has aspheric surfaces on both sides, and a predetermined conditional expression is satisfied.

8 Claims, 4 Drawing Sheets

IMAGING LENS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (CN107450157A) discloses an imaging lens comprising, in order from an object side, a first lens with positive refractive power, a second lens having an aspheric object-side surface or an aspheric image-side surface, a third lens having a concave image-side surface at a peripheral area, a fourth lens having a convex image-side surface, a fifth lens with negative refractive power, and a sixth lens having a concave object-side surface, wherein a relationship between a relationship between a focal length of the first lens and a focal length of the second lens, a relationship between the focal length of the first lens and a total track length, and a relationship between a focal length of the overall optical system and the total track length satisfy a certain condition.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface", "a concave surface" or "a flat surface" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power having a convex object-side surface in a paraxial region, a second lens with negative refractive power having a concave image-side surface in a paraxial region, a third lens having a convex object-side surface in a paraxial region, a fourth lens having a convex image-side surface in a paraxial region, a fifth lens having a convex object-side surface in a paraxial region, and a sixth lens having a concave image-side surface in a paraxial region, wherein three out of four lenses from the third lens to the sixth lens have positive refractive power or negative refractive power in the paraxial region, and one out of four lenses is formed in a meniscus shape, substantially has no refractive power in the paraxial region, and has aspheric surfaces on both sides.

According to the imaging lens having an above-described configuration, the first lens achieves reduction in a profile by strengthening the refractive power.

The second lens properly corrects spherical aberration, chromatic aberration, astigmatism and distortion.

One out of four lenses from the third lens to the sixth lens is formed in a meniscus shape, substantially has no refractive power in the paraxial region, and has aspheric surfaces on both sides. Three out of the four lenses from the third lens to the sixth lens have positive refractive power or negative refractive power in the paraxial region.

Forming the lens which substantially has no refractive power in the paraxial region in a meniscus shape in the paraxial region contributes to proper correction of the spherical aberration and coma aberration. Furthermore, aspheric surfaces on both sides can properly correct the astigmatism, field curvature, and the distortion occurring off-axially, an increase in aberrations due to low F-number is suppressed.

An imaging lens according to the present invention comprises five lenses having refractive powers and one lens correcting the aberrations on and off the optical axial and substantially having no refractive power. Depending on an arrangement of the lenses from the third lens to the sixth lens having the positive or negative refractive power, it can be determined where the lens substantially having no refractive power should be disposed.

By applying such structure, a low profile can be maintained and the chromatic aberration, the spherical aberration, the coma aberration, the astigmatism, the field curvature and the distortion can be properly corrected.

According to the imaging lens having the above-described configuration, it is preferable that the following conditional expression (1) is satisfied:

$$1E^6 \text{ mm} < |fCNE| \text{mm} \quad (1)$$

where fCNE: a focal length of a lens substantially having no refractive power.

The conditional expression (1) defines a focal length of a lens substantially having no refractive power. By satisfying the conditional expression (1), the spherical aberration, the coma aberration, the astigmatism, the field curvature and the distortion ca be properly corrected without affecting a focal length of the overall optical system of the imaging lens.

According to the imaging lens having the above-described configuration, it is preferable that the following conditional expression (2) is satisfied:

$$|(nCNE-1) \times (1/CNEr1 - 1/CNEr2) + (nCNE-1)^2 \times dCNE/nCNE/CNEr1/CNEr2| < 1E^{-6} \quad (2)$$

where nCNE: a refractive index at d-ray of a lens substantially having no refractive power, CNEr1: a paraxial curvature radius of an object-side surface of a lens substantially having no refractive power, CNEr2: a paraxial curvature radius of an image-side surface of a lens substantially having no refractive power, and dCNE: a thickness along the optical axis of a lens substantially having no refractive power.

The conditional expression (2) defines refractive power of the lens substantially having no refractive power. By satisfying the conditional expression (2), the spherical aberration, the coma aberration, the astigmatism, the field curvature, and the distortion can be properly corrected without affecting a focal length of the overall optical system of the imaging lens.

According to the imaging lens having the above-described configuration, it is preferable that the following conditional expression (3) is satisfied:

$$1E^6 < |fCNE + (-CNEr1 \times dCNE/(CNEr2 - CNEr1 + dCNE))| \quad (3)$$

where fCNE: a focal length of a lens substantially having no refractive power,

CNEr1: a paraxial curvature radius of an object-side surface of a lens substantially having no refractive power, CNEr2: a paraxial curvature radius of an image-side surface of a lens substantially having no refractive power, and dCNE: a thickness along the optical axis of a lens substantially having no refractive power.

The conditional expression (3) defines a back focus of the lens substantially having no refractive power. By satisfying the conditional expression (3), the spherical aberration, the coma aberration, the astigmatism, the field curvature, and the distortion can be properly corrected by aspheric surfaces on both sides without affecting a focal length of the overall optical system of the imaging lens.

According to the imaging lens having the above-described configuration, it is preferable that the first lens has an object-side surface being convex in the paraxial region.

When the first lens has the object-side surface being convex in the paraxial region, the spherical aberration and the distortion can be properly corrected.

According to the imaging lens having the above-described configuration, it is preferable that the first lens has an image-side surface being concave in the paraxial region.

When the first lens has the image-side surface being concave in the paraxial region, the spherical aberration, the astigmatism and the distortion can be properly corrected.

According to the imaging lens having the above-described configuration, it is preferable that the second lens has an image-side surface being concave in the paraxial region.

When the second lens has the image-side surface being concave in the paraxial region, the astigmatism and the distortion can be properly corrected.

According to the imaging lens having the above-described configuration, it is preferable that the third lens has an object-side surface being convex in the paraxial region.

When the third lens has the object-side surface being convex in the paraxial region, the astigmatism and the distortion can be properly corrected.

According to the imaging lens having the above-described configuration, it is preferable that the fourth lens has an image-side surface being convex in the paraxial region.

When the fourth lens has the image-side surface being convex in the paraxial region, a light ray incident angle to the image-side surface of the fourth lens can be appropriately controlled, and the astigmatism, the field curvature and the distortion can be properly corrected.

According to the imaging lens having the above-described configuration, it is preferable that the fifth lens has an object-side surface being convex in the paraxial region.

When the fifth lens has the object-side surface being convex in the paraxial region, the astigmatism, the field curvature and the distortion can be properly corrected.

According to the imaging lens having the above-described configuration, it is preferable that the sixth lens has an object-side surface being convex in the paraxial region.

When the sixth lens has the object-side surface being convex in the paraxial region, the astigmatism and the field curvature can be properly corrected.

According to the imaging lens having the above-described configuration, it is preferable that the sixth lens has an image-side surface being concave in the paraxial region.

When the sixth lens has the image-side surface being concave in the paraxial region, the low profile is maintained and the back focus is secured. Furthermore, the chromatic aberration, the distortion, the astigmatism, and the field curvature can be properly corrected.

According to the imaging lens having the above-described configuration, it is preferable that the following conditional expression (4) is satisfied:

$$39 < vd5 < 73 \quad (4)$$

where vd5: an abbe number at d-ray of the fifth lens.

The conditional expression (4) defines an appropriate range of the abbe number at d-ray of the fifth lens. By satisfying the conditional expression (4), the chromatic aberration can be properly corrected.

According to the imaging lens having the above-described configuration, it is preferable that the following conditional expression (5) is satisfied:

$$8.30 < (D1/f1) \times 100 < 13.00 \quad (5)$$

where

D1: a thickness of the first lens along the optical axis, and f1: a focal length of the first lens.

The conditional expression (5) defines an appropriate range of the thickness of the first lens along the optical axis. When a value is below the upper limit of the conditional expression (5), the thickness along the optical axis of the first lens is prevented from being too large, and an air gap on the image side of the first lens is easily secured. As a result, reduction in the profile is achieved. On the other hand, when the value is above the lower limit of the conditional expression (5), the thickness along the optical axis of the first lens is prevented from being too small, and formability of the lens is improved.

Furthermore, by satisfying the conditional expression (5), the spherical aberration and the distortion can be properly corrected.

According to the imaging lens having the above-described configuration, it is preferable that the following conditional expression (6) is satisfied:

$$-4.35 < (T1/f2) \times 100 < -2.00 \quad (6)$$

where

T1: a distance along the optical axis from an image-side surface of the first lens to an object-side surface of the second lens, and f2: a focal length of the second lens.

The conditional expression (6) defines an appropriate range of the distance along the optical axis between the first lens and the second lens. By satisfying the conditional expression (6), the spherical aberration, the coma aberration, and the distortion can be properly corrected.

According to the imaging lens having the above-described configuration, it is preferable that the following conditional expression (7) is satisfied:

$$0.20<|r6|/f<1.55 \tag{7}$$

where r6: a paraxial curvature radius of an image-side surface of the third lens, and f: a focal length of the overall optical system of the imaging lens.

The conditional expression (7) defines an appropriate range of the paraxial curvature radius of the image-side surface of the third lens. By satisfying the conditional expression (7), the spherical aberration, the coma aberration, the astigmatism, and the distortion can be properly corrected.

According to the imaging lens having the above-described configuration, it is preferable that the following conditional expression (8) is satisfied:

$$3.70<(T5/TTL)\times100<13.00 \tag{8}$$

where

T5: a distance along the optical axis from an image-side surface of the fifth lens to an object-side surface of the sixth lens, and TTL: a total track length.

The conditional expression (8) defines an appropriate range of the distance along the optical axis between the fifth lens and the sixth lens. By satisfying the conditional expression (8), the astigmatism and the distortion can be properly corrected.

According to the imaging lens having the above-described configuration, it is preferable that the following conditional expression (9) is satisfied:

$$0.55<T1/T2<1.55 \tag{9}$$

where

T1: a distance along the optical axis from an image-side surface of the first lens to an object-side surface of the second lens, and T2: a distance along the optical axis from an image-side surface of the second lens to an object-side surface of the third lens.

The conditional expression (9) defines an appropriate range of the distance along the optical axis from the image-side surface of the first lens to the object-side surface of the second lens, and the distance along the optical axis from the image-side surface of the second lens to the object-side surface of the third lens. By satisfying the conditional expression (9), difference between the distance from the first lens to the second lens and the distance from the second lens to the third lens are prevented from being large, and reduction in the profile is achieved. Furthermore, by satisfying the conditional expression (9), the coma aberration, the astigmatism and the distortion can be properly corrected.

According to the imaging lens having the above-described configuration, it is preferable that the first lens and the second lens have positive composite refractive power in the paraxial region, and more preferable that the following conditional expression (10) is satisfied:

$$1.50<f12/f<4.00 \tag{10}$$

where f12: a composite focal length of the first lens and the second lens, and f: a focal length of the overall optical system of the imaging lens.

The conditional expression (10) defines an appropriate range of the composite refractive power of the first lens and the second lens. When a value is below the upper limit of the conditional expression (10), the positive composite refractive power of the first lens and the second lens becomes appropriate, and reduction in the profile can be achieved. On the other hand, when the value is above the lower limit of the conditional expression (10), the astigmatism, the field curvature, and the distortion can be properly corrected.

According to the imaging lens having the above-described configuration, it is preferable that the following conditional expression (11) is satisfied:

$$0.70<r2/f<4.00 \tag{11}$$

where r2: a paraxial curvature radius of an image-side surface of the first lens, and f: a focal length of the overall optical system of the imaging lens.

The conditional expression (11) defines an appropriate range of the paraxial curvature radius of the image-side surface of the first lens. When a value is below the upper limit of the conditional expression (11), the astigmatism and the distortion can be properly corrected. On the other hand, when the value is above the lower limit of the conditional expression (11), the spherical aberration can be properly corrected.

According to the imaging lens having the above-described configuration, it is preferable that the following conditional expression (12) is satisfied:

$$0.50<r5/f<3.00 \tag{12}$$

where r5: a paraxial curvature radius of an object-side surface of the third lens, and f: a focal length of the overall optical system of the imaging lens.

The conditional expression (12) defines an appropriate range of the paraxial curvature radius of the object-side surface of the third lens. When a value is below the upper limit of the conditional expression (12), the astigmatism and the distortion can be properly corrected. On the other hand, when the value is above the lower limit of the conditional expression (12), the spherical aberration can be properly corrected.

According to the imaging lens having the above-described configuration, it is preferable that the following conditional expression (13) is satisfied:

$$0.20<r9/f<6.50 \tag{13}$$

where r9: a paraxial curvature radius of an object-side surface of the fifth lens, and f: a focal length of the overall optical system of the imaging lens.

The conditional expression (13) defines an appropriate range of the paraxial curvature radius of the object-side surface of the fifth lens. By satisfying the conditional expression (13), the coma aberration, the astigmatism, the field curvature, and the distortion can be properly corrected.

Effect of Invention

According to the present invention, there can be provided an imaging lens with high resolution which satisfies demand of the low profile and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

FIGS. 1, 3, 5 and 7 are schematic views of the imaging lenses in Examples 1 to 4 according to the embodiments of the present invention, respectively.

As shown in Drawings, the imaging lens according to the present embodiment comprises, in order from an object side to an image side, a first lens L1 with positive refractive power having a convex object-side surface in a paraxial region, a second lens L2 with negative refractive power having a concave image-side surface in a paraxial region, a third lens L3 having a convex object-side surface in a paraxial region, a fourth lens L4 having a convex image-side surface in a paraxial region, a fifth lens L5 having a convex object-side surface in a paraxial region, and a sixth lens L6 having a concave image-side surface in a paraxial region.

A filter IR such as an IR cut filter or a cover glass is arranged between the sixth lens L6 and an image plane IMG (namely, the image plane of an image sensor). The filter IR is omissible.

By arranging an aperture stop ST on the object side of the first lens L1, correction of aberrations and control of an incident angle of the light ray of high image height to an image sensor become facilitated.

Figure 1:
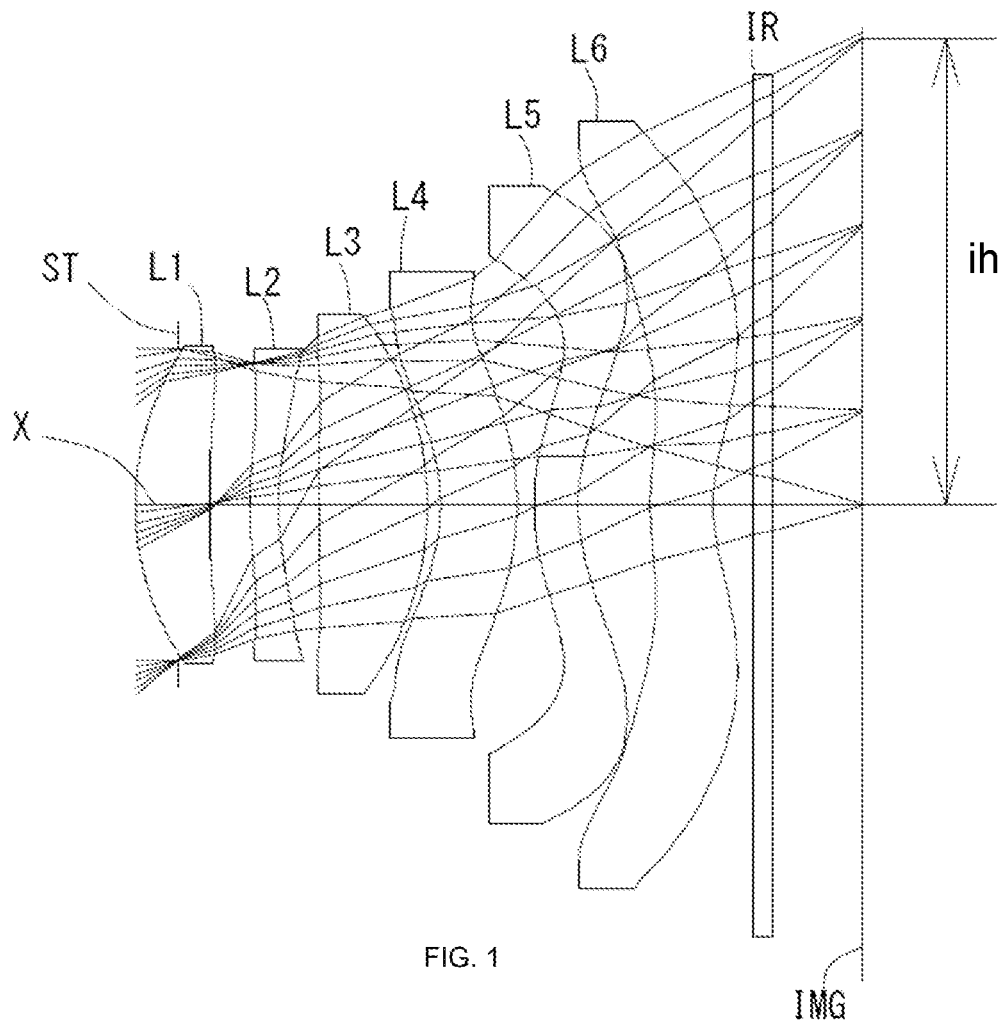
FIG. 1 is a schematic view showing an imaging lens in Example 1 according to the present invention.

The imaging lens according to Example 1 shown in FIG. 1 comprises, in order from an object side to an image side, the first lens L1 with positive refractive power, formed in a meniscus shape having the object-side surface being convex and an image-side surface being concave in the paraxial region (near the optical axis X), the second lens L2 with negative refractive power, formed in the meniscus shape having an object-side surface being convex and the image-side surface being concave in the paraxial region, the third lens L3 with the positive refractive power, formed in a biconvex shape having a convex object-side surface and a convex image-side surface in the paraxial region, the fourth lens L4 with negative refractive power, formed in the meniscus shape having an aspheric object-side surface being concave and the aspheric image-side surface being convex in the paraxial region, the fifth lens L5 formed in the meniscus shape having the object-side surface being convex and the image-side surface being concave in the paraxial region, and substantially having no refractive power, and the sixth lens L6 with negative refractive power, formed in the meniscus shape having an object-side surface being convex and the image-side surface being concave in the paraxial region, wherein the conditional expression (1) is satisfied:

$$1E^6 \text{ mm} < |fCNE| \text{mm} \qquad (1)$$

where fCNE: a focal length of a lens substantially having no refractive power.

According to the imaging lens having the above-described configuration, the first lens L1 achieves reduction in the profile, and properly corrects the spherical aberration, the astigmatism, and the distortion.

The second lens L2 properly corrects the spherical aberration, the chromatic aberration, the astigmatism, and the distortion.

The third lens L3 properly corrects the spherical aberration, the coma aberration, the astigmatism, and the distortion. Furthermore, when the both-side surfaces are convex, curvatures are suppressed from being large, and sensitivity to a manufacturing error can be reduced.

The fourth lens L4 properly corrects the astigmatism, the field curvature, and the distortion.

By satisfying the conditional expression (1), the fifth lens L5 properly corrects the astigmatism, the field curvature, and the distortion by aspheric surfaces on both sides without affecting a focal length of the overall optical system of the imaging lens. The fifth lens L5 is formed in the meniscus shape having the object-side surface being convex and the image-side surface being concave in the paraxial region, therefore the spherical aberration and the coma aberration can be properly corrected.

The sixth lens L6 maintains the low profile and secures a back focus, and properly corrects the chromatic aberration, the distortion, the astigmatism, and the field curvature.

Figure 3:
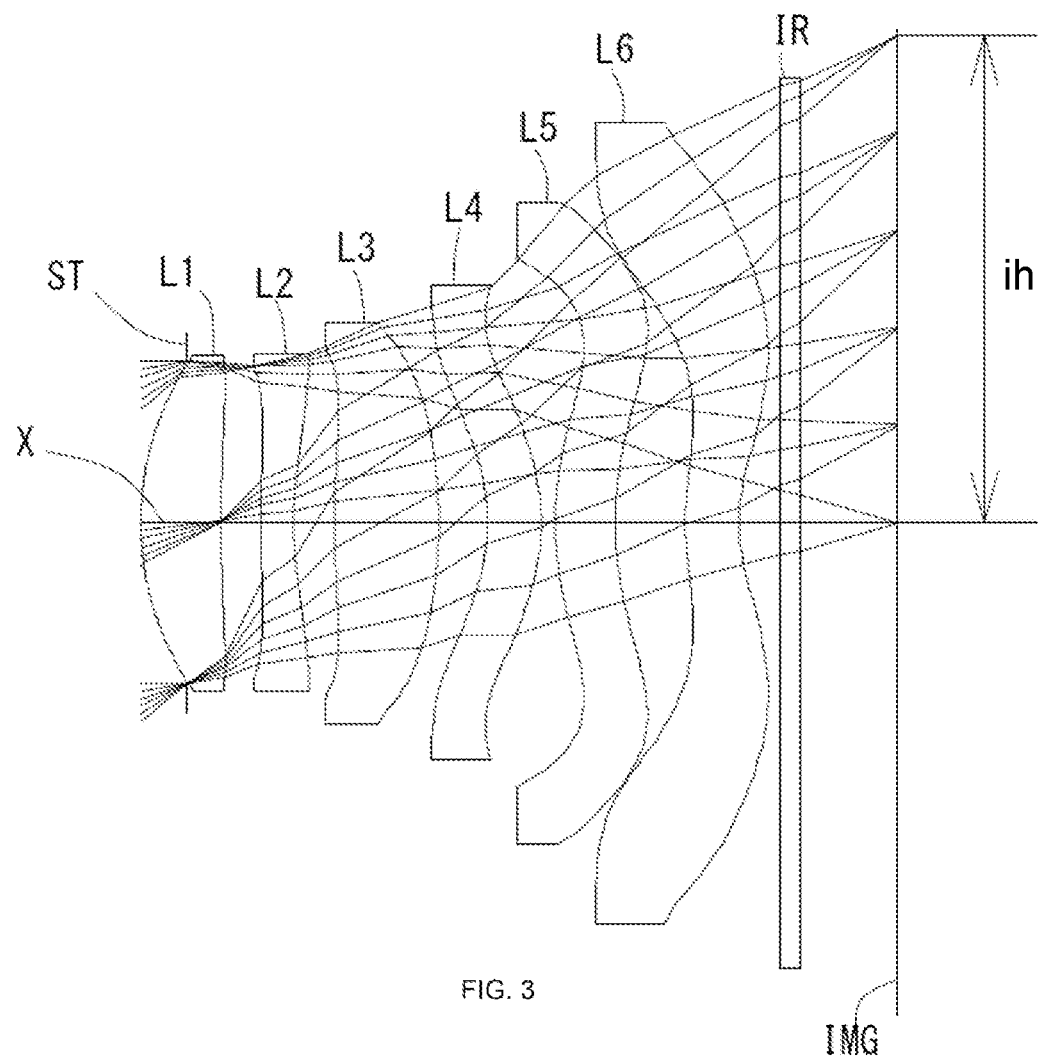
FIG. 3 is a schematic view showing an imaging lens in Example 2 according to the present invention.

The imaging lens according to Example 2 shown in FIG. 3 comprises, in order from an object side to an image side, the first lens L1 with positive refractive power, formed in a meniscus shape having the object-side surface being convex and an image-side surface being concave in the paraxial region (near the optical axis X), the second lens L2 with negative refractive power, formed in the meniscus shape having an object-side surface being convex and the image-side surface being concave in the paraxial region, the third lens L3 with the positive refractive power, formed in a biconvex shape having a convex object-side surface and a convex image-side surface in the paraxial region, the fourth lens L4 formed in the meniscus shape having an aspheric object-side surface being concave and the aspheric image-side surface being convex in the paraxial region, and substantially having no refractive power, the fifth lens L5 with the positive refractive power, formed in the meniscus shape having the object-side surface being convex and the image-side surface being concave in the paraxial region, and the sixth lens L6 with negative refractive power, formed in the meniscus shape having an object-side surface being convex and the image-side surface being concave in the paraxial region, wherein the conditional expression (1) is satisfied:

$$1E^6 \text{ mm} < |fCNE| \text{mm} \quad (1)$$

where fCNE: a focal length of a lens substantially having no refractive power.

According to the imaging lens having the above-described configuration, the first lens L1 achieves reduction in the profile, and properly corrects the spherical aberration, the astigmatism, and the distortion.

The second lens L2 properly corrects the spherical aberration, the chromatic aberration, the astigmatism, and the distortion.

The third lens L3 properly corrects the spherical aberration, the coma aberration, the astigmatism, and the distortion. Furthermore, when the both-side surfaces are convex, curvatures are suppressed from being large, and sensitivity to a manufacturing error can be reduced.

By satisfying the conditional expression (1), the fourth lens L4 properly corrects the astigmatism, the field curvature, and the distortion by aspheric surfaces on both sides without affecting a focal length of the overall optical system of the imaging lens. The fourth lens L4 is formed in the meniscus shape having the object-side surface being concave and the image-side surface being convex in the paraxial region, therefore the spherical aberration and the coma aberration can be properly corrected.

The fifth lens L5 achieves reduction in the profile, and properly corrects the astigmatism, he field curvature, and the distortion.

The sixth lens L6 maintains the low profile and secures a back focus, and properly corrects the chromatic aberration, the distortion, the astigmatism, and the field curvature.

Figure 5:
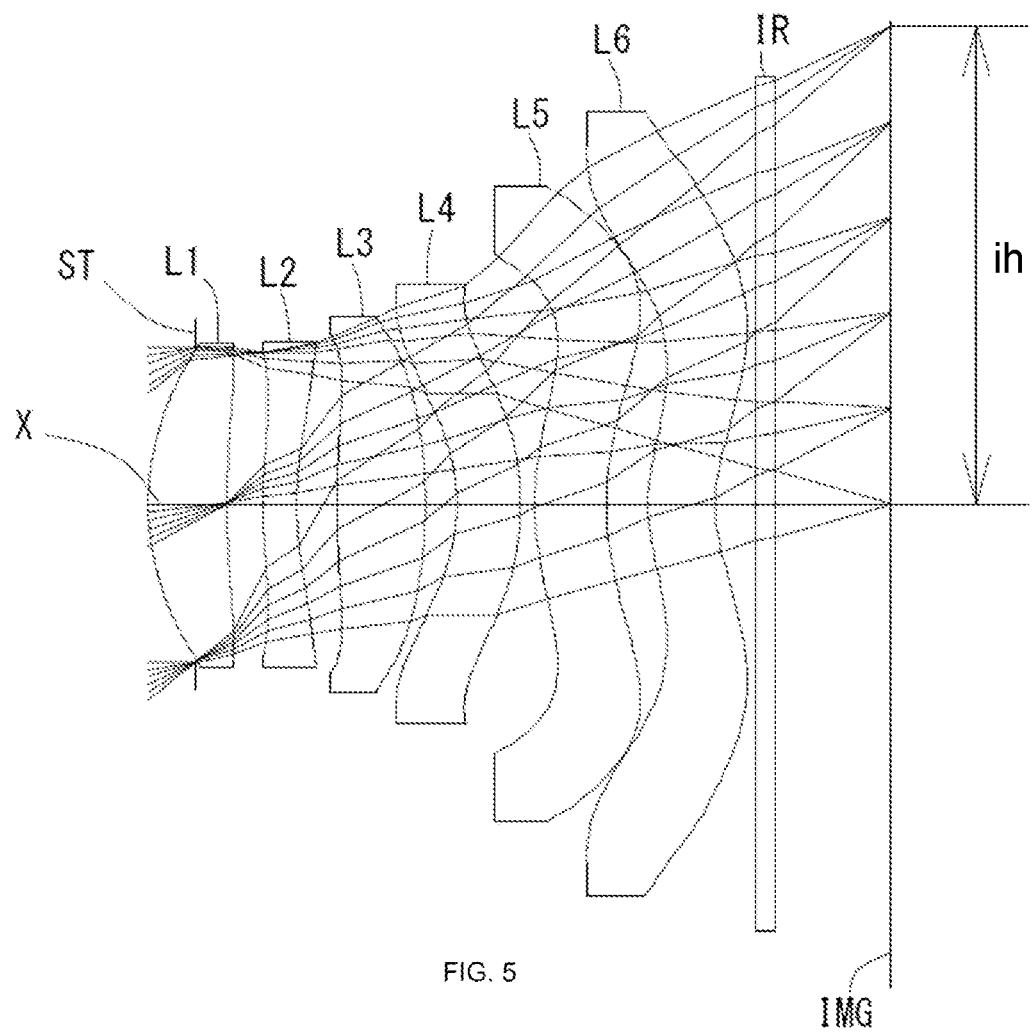
FIG. 5 is a schematic view showing an imaging lens in Example 3 according to the present invention.

The imaging lens according to Example 3 shown in FIG. 5 comprises, in order from an object side to an image side, the first lens L1 with positive refractive power, formed in a meniscus shape having the object-side surface being convex and an image-side surface being concave in the paraxial region (near the optical axis X), the second lens L2 with negative refractive power, formed in the meniscus shape having an object-side surface being convex and the image-side surface being concave in the paraxial region, the third lens L3 with the positive refractive power, formed in a biconvex shape having a convex object-side surface and a convex image-side surface in the paraxial region, the fourth lens L4 with negative refractive power, formed in the meniscus shape having the object-side surface being concave and the image-side surface being convex in the paraxial region, the fifth lens L5 with positive refractive power, formed in the meniscus shape having the object-side surface being convex and the image-side surface being concave in the paraxial region, and the sixth lens L6, formed in the meniscus shape having an aspheric object-side surface being convex and the aspheric image-side surface being concave in the paraxial region, and substantially having no refractive power, wherein the conditional expression (1) is satisfied:

$$1E^6 \text{ mm} < |fCNE| \text{mm} \quad (1)$$

where fCNE: a focal length of a lens substantially having no refractive power.

According to the imaging lens having the above-described configuration, the first lens L1 achieves reduction in the profile, and properly corrects the spherical aberration, the astigmatism, and the distortion.

The second lens L2 properly corrects the spherical aberration, the chromatic aberration, the astigmatism, and the distortion.

The third lens L3 properly corrects the spherical aberration, the coma aberration, the astigmatism, and the distortion. Furthermore, when the both-side surfaces are convex, curvatures are suppressed from being large, and sensitivity to a manufacturing error can be reduced.

The fourth lens L4 properly corrects the astigmatism, the field curvature and the distortion.

The fifth lens L5 achieves reduction in the profile, and properly corrects the astigmatism, the field curvature and the distortion.

By satisfying the conditional expression (1), the sixth lens L6 properly corrects the astigmatism, the field curvature, and the distortion by aspheric surfaces on both sides without affecting a focal length of the overall optical system of the imaging lens. The sixth lens L6 is formed in the meniscus shape having the object-side surface being convex and the image-side surface being concave in the paraxial region, therefore the spherical aberration and the coma aberration can be properly corrected.

Figure 7:
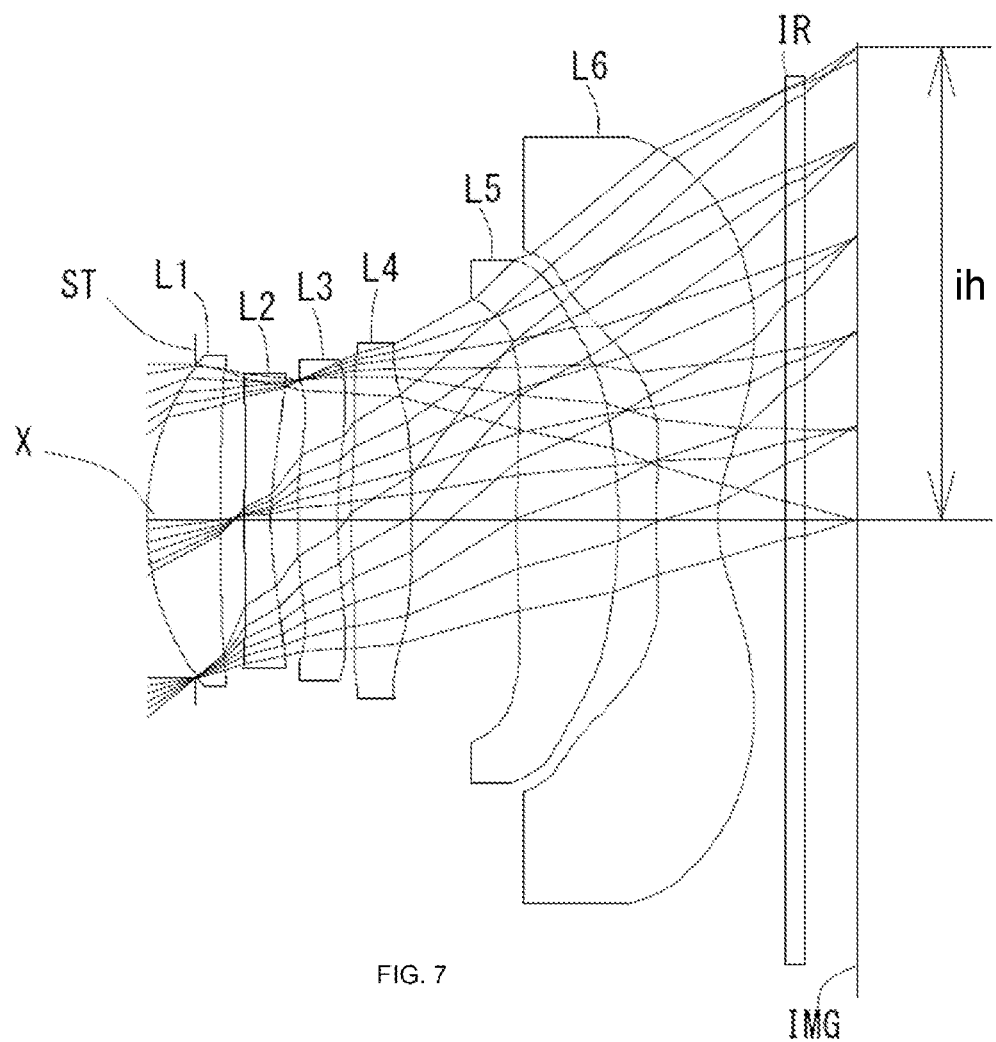
FIG. 7 is a schematic view showing an imaging lens in Example 4 according to the present invention.

The imaging lens according to Example 4 shown in FIG. 7 comprises, in order from an object side to an image side, the first lens L1 with positive refractive power, formed in a meniscus shape having the object-side surface being convex and an image-side surface being concave in the paraxial region (near the optical axis X), the second lens L2 with negative refractive power, formed in the meniscus shape having an object-side surface being convex and the image-side surface being concave in the paraxial region, the third lens L3 formed in the meniscus shape having an aspheric object-side surface being convex and the aspheric image-side surface being concave in the paraxial region, and substantially having no refractive power, the fourth lens L4 with positive refractive power, formed in the biconvex shape having a convex object-side surface and a convex image-side surface in the paraxial region, the fifth lens L5 with positive refractive power, formed in the biconvex shape having a convex object-side surface and a convex image-side surface in the paraxial region, and the sixth lens L6 with negative refractive power, formed in the meniscus shape having the object-side surface being convex and an image-side surface being concave in the paraxial region, wherein the conditional expression (1) is satisfied:

$$1E^6 \text{ mm} < |fCNE| \text{mm} \quad (1)$$

where fCNE: a focal length of a lens substantially having no refractive power.

According to the imaging lens having the above-described configuration, the first lens L1 achieves reduction in the profile, and properly corrects the spherical aberration, the astigmatism, and the distortion.

The second lens L2 properly corrects the spherical aberration, the chromatic aberration, the astigmatism, and the distortion.

By satisfying the conditional expression (1), the third lens L3 properly corrects the astigmatism, the field curvature, and the distortion by aspheric surfaces on both sides without affecting a focal length of the overall optical system of the imaging lens. The third lens L3 is formed in the meniscus shape having the object-side surface being convex and the image-side surface being concave in the paraxial region, therefore the spherical aberration and the coma aberration can be properly corrected.

The fourth lens L4 achieves reduction in the profile, and properly corrects the coma aberration, the astigmatism, the field curvature and the distortion. Furthermore, when the both-side surfaces are convex, curvatures are suppressed from being large, and sensitivity to a manufacturing error can be reduced.

The fifth lens L5 achieves reduction in the profile, and properly corrects the coma aberration, the astigmatism, the field curvature and the distortion. Furthermore, when the both-side surfaces are convex, curvatures are suppressed from being large, and sensitivity to a manufacturing error can be reduced.

The sixth lens L6 maintains the low profile and secures a back focus, and properly corrects the chromatic aberration, the distortion, the astigmatism, and the field curvature.

Regarding the imaging lens according to the present embodiments, it is preferable that all lenses of the first lens L1 to the sixth lens L6 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with a case in which a cemented lens is used, workload is reduced, and manufacturing in low cost becomes possible.

Furthermore, the imaging lens according to the present embodiments makes manufacturing facilitated by using a plastic material for the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (13).

$$1E^6 \text{ mm} < |fCNE| \text{mm} \tag{1}$$

$$|(nCNE-1) \times (1/CNEr1 - 1/CNEr2) + (nCNE-1)^2 \times dCNE/nCNE/CNEr1/CNEr2| < 1E^{-6} \tag{2}$$

$$1E^6 < |fCNE + (-CNEr1 \times dCNE/(CNEr2 - CNEr1 + dCNE))| \tag{3}$$

$$39 < vd5 < 73 \tag{4}$$

$$8.30 < (D1/f1) \times 100 < 13.00 \tag{5}$$

$$-4.35 < (T1/f2) \times 100 < -2.00 \tag{6}$$

$$0.20 < |r6|/f < 1.55 \tag{7}$$

$$3.70 < (T5/TTL) \times 100 < 13.00 \tag{8}$$

$$0.55 < T1/T2 < 1.55 \tag{9}$$

$$1.50 < f12/f < 4.00 \tag{10}$$

$$0.70 < r2/f < 4.00 \tag{11}$$

$$0.50 < r5/f < 3.00 \tag{12}$$

$$0.20 < r9/f < 6.50 \tag{13}$$

where
vd5: an abbe number at d-ray of the fifth lens,
D1: a thickness of the first lens along the optical axis,
T1: a distance along the optical axis from an image-side surface of the first lens to an object-side surface of the second lens,
T2: a distance along the optical axis from an image-side surface of the second lens to an object-side surface of the third lens,
T5: a distance along the optical axis from an image-side surface of the fifth lens to an object-side surface of the sixth lens,
TTL: a total track length,
fCNE: a focal length of a lens substantially having no refractive power,
nCNE: a refractive index at d-ray of a lens substantially having no refractive power,
CNEr1: a paraxial curvature radius of an object-side surface of a lens substantially having no refractive power,
CNEr2: a paraxial curvature radius of an image-side surface of a lens substantially having no refractive power,
dCNE: a thickness along the optical axis of a lens substantially having no refractive power,
f: a focal length of the overall optical system of the imaging lens,
f1: a focal length of the first lens,
f2: a focal length of the second lens,
f12: a composite focal length of the first lens and the second lens,
r2: a paraxial curvature radius of an image-side surface of the first lens,
r5: a paraxial curvature radius of an object-side surface of the third lens,
r6: a paraxial curvature radius of an image-side surface of the third lens, and
r9: a paraxial curvature radius of an object-side surface of the fifth lens.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (13a).

$$3E^6 \text{ mm} < |fCNE| \text{mm} \tag{1a}$$

$$48 < vd5 < 64 \tag{2a}$$

$$|(nCNE-1) \times (1/CNEr1 - 1/CNEr2) + (nCNE-1)^2 \times dCNE/nCNE/CNEr1/CNEr2| < 4E^{-7} \tag{3a}$$

$$3E^6 < |fCNE + (-CNEr1 \times dCNE/(CNEr2 - CNEr1 + dCNE))| \tag{4a}$$

$$9.00 < (D1/f1) \times 100 < 12.50 \tag{5a}$$

$$-4.00 < (T1/f2) \times 100 < -2.15 \tag{6a}$$

$$0.40 < |r6|/f < 1.35 \tag{7a}$$

$$4.50 < (T5/TTL) \times 100 < 11.50 \tag{8a}$$

$$0.80 < T1/T2 < 1.25 \tag{9a}$$

$$1.65 < f12/f < 3.00 \tag{10a}$$

$$1.00 < r2/f < 3.30 \tag{11a}$$

$$0.70 < r5/f < 2.80 \tag{12a}$$

$$0.30 < r9/f < 5.25 \tag{13a}$$

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14 and A16 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16}$$

[Equation 1]

Next, examples of the imaging lens according to this embodiment will be explained. In each example, f denotes a focal length of the overall optical system of the imaging lens, Fno denotes a F-number, ω denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and νd denotes an abbe number at d-ray. As for aspheric surfaces, an asterisk (*) is added after surface number i.

Example 1

The basic lens data is shown below in Table 1.

TABLE 1

Example 1
Unit mm
f = 4.23
Fno = 1.80
ω(°) = 39.4
ih = 3.53
TTL = 5.44

Surface Data

| i | r | d | Nd | νd | |
|---|---|---|---|---|---|
| (Object) | Infinity | Infinity | | | |
| 1 (Stop) | Infinity | −0.3225604000 | | | |
| 2* | 2.0681955505 | 0.5635190373 | 1.544503 | 55.98 | (νd1) |
| 3* | 7.3337813912 | 0.3067768588 | | | |
| 4* | 3.1243260029 | 0.2142947175 | 1.661172 | 20.37 | (νd2) |
| 5* | 2.1513824455 | 0.2997402616 | | | |
| 6* | 10.7816509555 | 0.8269788800 | 1.544503 | 55.98 | (νd3) |
| 7* | −2.3831621211 | 0.1000000000 | | | |
| 8* | −1.4596546128 | 0.5769155314 | 1.614220 | 25.58 | (νd4) |
| 9* | −2.0490353604 | 0.1276017018 | | | |
| 10* | 1.7382937100 | 0.3360413668 | 1.544503 | 55.98 | (νd5) |
| 11* | 1.6198250829 | 0.5424421462 | | | |
| 12* | 2.3461807450 | 0.4770121742 | 1.534809 | 55.66 | (νd6) |
| 13* | 1.3399343912 | 0.3000000000 | | | |
| 14 | Infinity | 0.1500000000 | 1.563000 | 51.30 | |
| 15 | Infinity | 0.6757311800 | | | |
| Image Plane | Infinity | | | | |

Constituent Lens Data

| Lens | Start Surface | Focal Length | Composite Focal length | | Lens Data substantially having no refractive power: L5 | |
|---|---|---|---|---|---|---|
| 1 | 2 | 5.098 | fl2 | 7.677 | fCNE | 20887144 |
| 2 | 4 | −11.453 | | | nCNE | 1.544503 |
| 3 | 6 | 3.666 | | | CNEr1 | 1.7382937100 |
| 4 | 8 | −13.165 | | | CNEr2 | 1.6198250829 |
| 5 | 10 | 20887144 | | | dCNE | 0.3360413668 |
| 6 | 12 | −6.998 | | | | |

Aspheric Surface Data

| | Second Surface | Third Surface | Fourth Surface | Fifth Surface | Sixth Surface | Seventh Surface |
|---|---|---|---|---|---|---|
| k | 1.301656E−01 | 2.174437E+01 | −6.271292E+00 | −2.468580E+00 | 4.950000E+01 | 1.073744E+00 |
| A4 | −8.619535E−03 | −3.703819E−02 | −1.694624E−01 | −1.418493E−01 | −3.791333E−02 | −8.413618E−02 |
| A6 | 3.550011E−02 | −2.310587E−02 | 7.226643E−02 | 5.458461E−02 | 7.466507E−02 | 3.832199E−01 |
| A8 | −1.017989E−01 | 1.046523E−01 | 1.853093E−03 | 6.332113E−02 | −2.793029E−01 | −7.022542E−01 |
| A10 | 1.712208E−01 | −1.708179E−01 | 5.894108E−03 | −8.833928E−02 | 4.628196E−01 | 7.006457E−01 |
| A12 | −1.667755E−01 | 1.379851E−01 | −5.612144E−02 | 3.015506E−02 | −4.451158E−01 | −3.864710E−01 |
| A14 | 8.618011E−02 | −5.760555E−02 | 5.499701E−02 | 1.404854E−02 | 2.234379E−01 | 1.107118E−01 |
| A16 | −1.886164E−02 | 8.861338E−03 | −1.766574E−02 | −8.053149E−03 | −4.346541E−02 | −1.278436E−02 |

TABLE 1-continued

Example 1
Unit mm
f = 4.23
Fno = 1.80
ω(°) = 39.4
h = 3.53
TTL = 5.44

|     | Eighth Surface | Ninth Surface | Tenth Surface | Eleventh Surface | Twelfth Surface | Thirteenth Surface |
| --- | --- | --- | --- | --- | --- | --- |
| k   | −1.131352E+00 | −1.529491E−01 | −2.183939E+00 | −1.034849E+00 | −1.586085E+01 | −6.506765E+00 |
| A4  | −7.961701E−03 | 2.963999E−02  | −2.299094E−02 | −6.288714E−02 | −2.002712E−01 | −1.190750E−01 |
| A6  | 3.376557E−01  | −6.294817E−03 | −7.738778E−02 | 1.008038E−03  | 9.136109E−02  | 5.321186E−02  |
| A8  | −6.753816E−01 | 1.812434E−02  | 7.684856E−02  | −6.417745E−03 | −1.639575E−02 | −1.586379E−02 |
| A10 | 7.159752E−01  | −1.465104E−02 | −5.478554E−02 | 4.849101E−03  | 6.893237E−06  | 2.742984E−03  |
| A12 | −4.065482E−01 | 9.938642E−03  | 2.193696E−02  | −1.352539E−03 | 3.746315E−04  | −2.466083E−04 |
| A14 | 1.183031 E−01 | −3.254295E−03 | −4.482131E−03 | 1.630956E−04  | −4.496063E−05 | 8.861250E−06  |
| A16 | −1.402624E−02 | 3.721011E−04  | 3.658166E−04  | −7.187193E−06 | 1.665291E−06  | 0.000000E+00  |

The imaging lens in Example 1 satisfies conditional expressions (1) to (13) as shown in Table 5.

Figure 2:
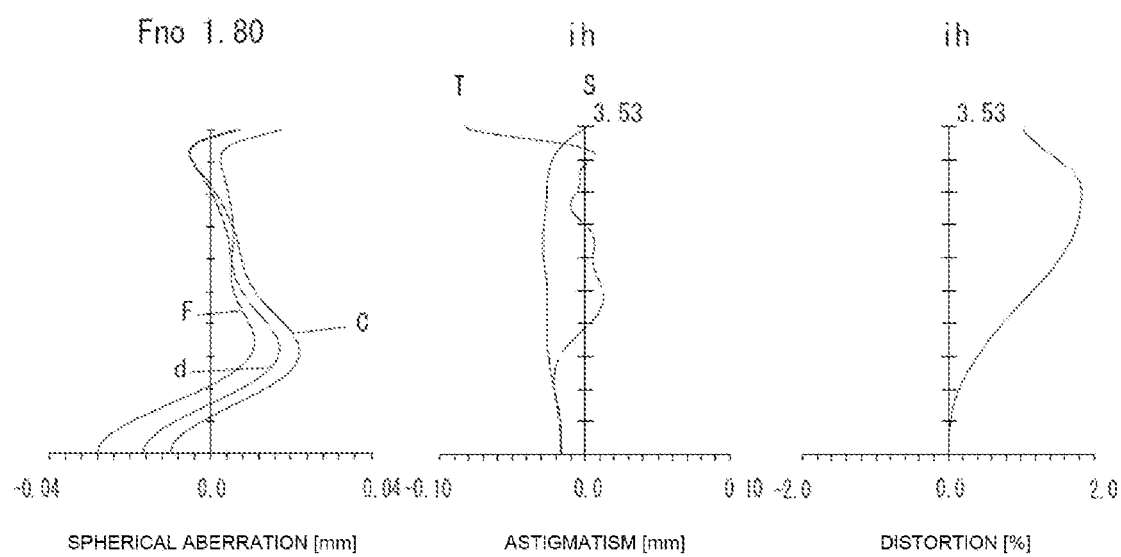
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm).

Figure 4:
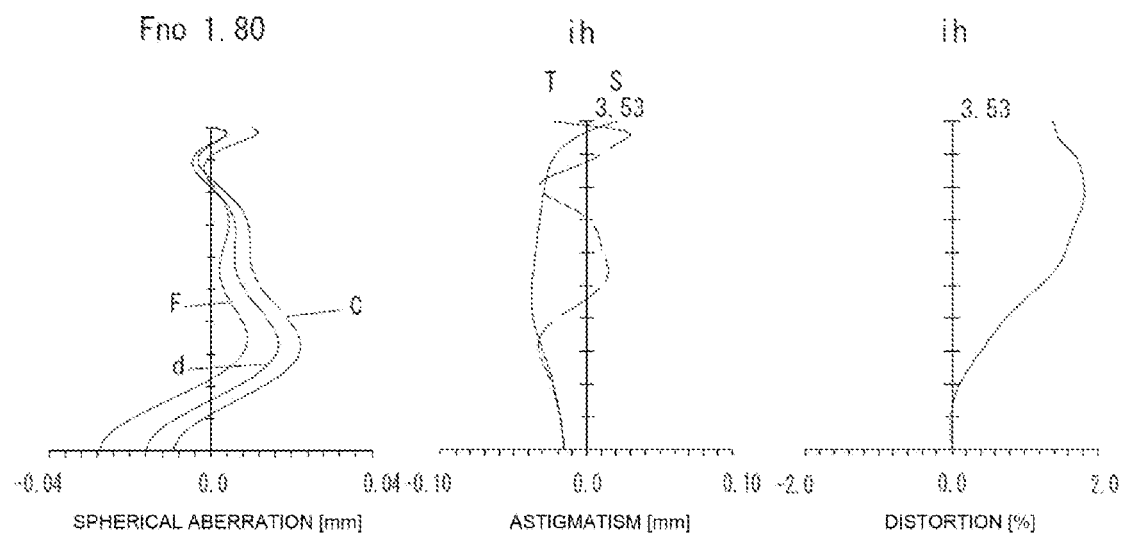
FIG. 4 shows spherical aberration, astigmatism, and distortion of the imaging lens in Example 2 according to the present invention.
Figure 6:
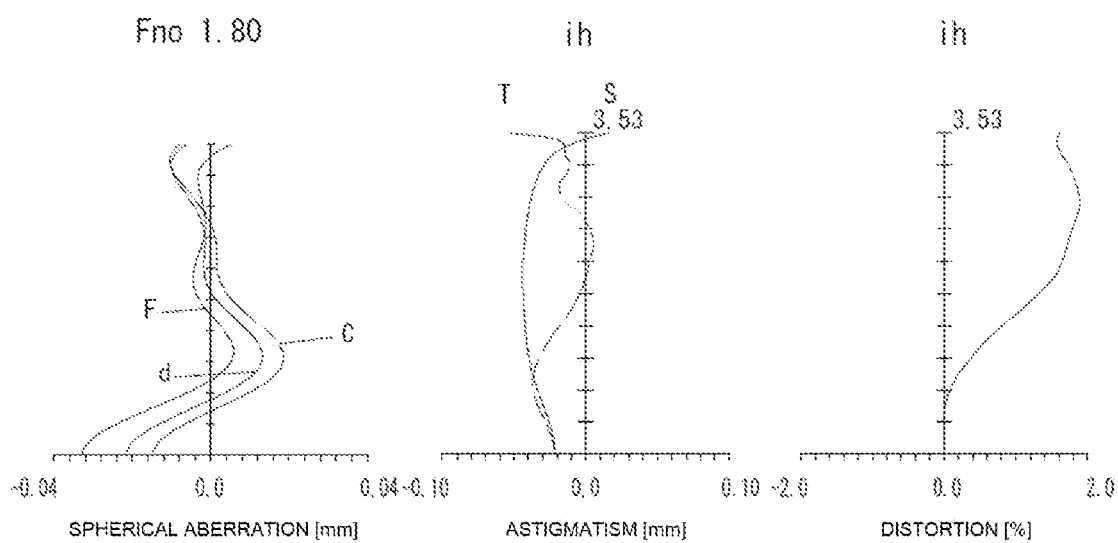
FIG. 6 shows spherical aberration, astigmatism, and distortion of the imaging lens in Example 3 according to the present invention.
Figure 8:
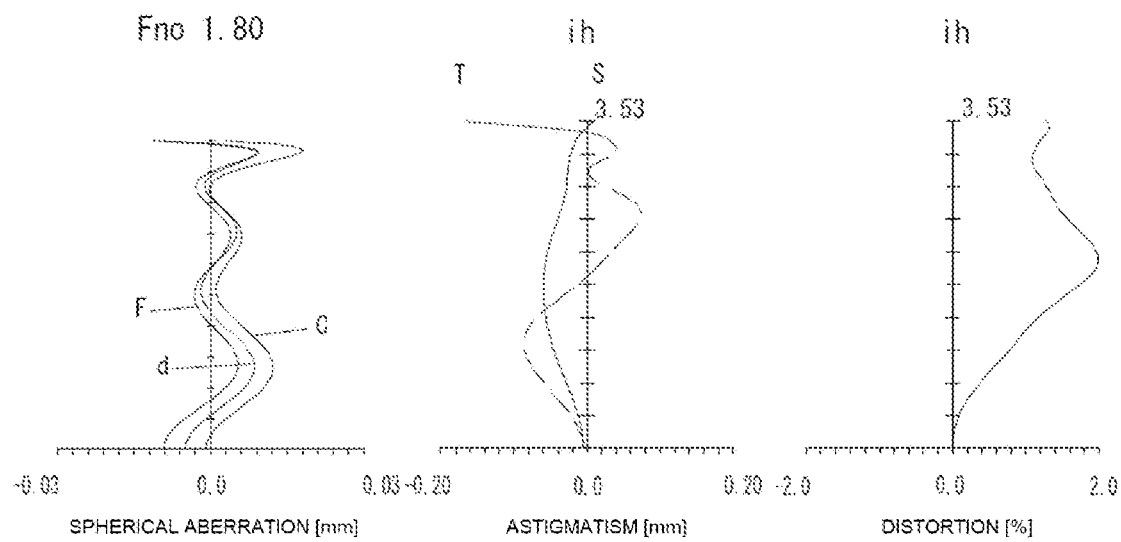
FIG. 8 shows spherical aberration, astigmatism, and distortion of the imaging lens in Example 4 according to the present invention.

The astigmatism diagram shows the amount of aberration at d-ray on a sagittal image surface S (solid line) and the amount of aberration at d-ray on tangential image surface T (broken line), respectively (same as FIGS. 4, 6 and 8). As shown in FIG. 2, each aberration is corrected excellently.

Example 2

The basic lens data is shown below in Table 2.

TABLE 2

Example 2
Unit mm
f = 4.22
Fno = 1.80
ω(°) = 39.3
h = 3.53
TTL = 5.44

Surface Data

| i | r | d | Nd | νd | |
| --- | --- | --- | --- | --- | --- |
| (Object) | Infinity | Infinity | | | |
| 1 (Stop) | Infinity | −0.3319693000 | | | |
| 2* | 2.1365558309 | 0.5817412937 | 1.544503 | 55.98 | (vd1) |
| 3* | 8.8824019945 | 0.2864994718 | | | |
| 4* | 4.5771666336 | 0.2400000000 | 1.661172 | 20.37 | (vd2) |
| 5* | 2.3885912257 | 0.2996262627 | | | |
| 6* | 6.8385427586 | 0.7554927680 | 1.544503 | 55.98 | (vd3) |
| 7* | −4.1117979138 | 0.3557048927 | | | |
| 8* | −1.4268625080 | 0.3900000000 | 1.614220 | 25.58 | (vd4) |
| 9* | −1.5752590900 | 0.1000000000 | | | |
| 10* | 2.5731066101 | 0.4400000000 | 1.544503 | 55.98 | (vd5) |
| 11* | 2.9792059816 | 0.5051342343 | | | |
| 12* | 2.0611453536 | 0.3900000000 | 1.534809 | 55.66 | (vd6) |
| 13* | 1.1672627531 | 0.3000000000 | | | |
| 14 | Infinity | 0.1500000000 | 1.563000 | 51.30 | |
| 15 | Infinity | 0.7011741100 | | | |
| Image Plane | Infinity | | | | |

Constituent Lens Data

| Lens | Start Surface | Focal Length | Composite Focal Length | | Lens Data substantially having no refractive power: L4 | |
| --- | --- | --- | --- | --- | --- | --- |
| 1 | 2 | 5.014 | fl2 | 9.979 | fCNE | 5523713 |
| 2 | 4 | −7.900 | | | nCNE | 1.614220 |
| 3 | 6 | 4.833 | | | CNEr1 | −1.4268625080 |
| 4 | 8 | 5523713 | | | CNEr2 | −1.5752590900 |
| 5 | 10 | 25.086 | | | dCNE | 0.3900000000 |
| 6 | 12 | −5.935 | | | | |

TABLE 2-continued

Example 2
Unit mm
f = 4.22
Fno = 1.80
ω(°) = 39.3
h = 3.53
TTL = 5.44

Aspheric Surface Data

|     | Second Surface | Third Surface | Fourth Surface | Fifth Surface | Sixth Surface | Seventh Surface |
| --- | --- | --- | --- | --- | --- | --- |
| k   | 0.000000E+00  | 3.203077E+01  | −4.554671E+00 | −2.769677E+00 | 3.518633E−01  | 4.300062E+00  |
| A4  | −5.811608E−03 | −3.902261E−02 | −2.198479E−01 | −1.927045E−01 | −5.089726E−02 | −6.489278E−02 |
| A6  | 2.641164E−02  | 1.206869E−03  | 2.221479E−01  | 1.888566E−01  | 1.269782E−02  | 1.673093E−01  |
| A8  | −5.609365E−02 | 5.940339E−02  | −2.425703E−01 | −1.274024E−01 | 4.349564E−03  | −2.657150E−01 |
| A10 | 8.225530E−02  | −1.079781E−01 | 2.674098E−01  | 6.190493E−02  | −9.468597E−02 | 1.983832E−01  |
| A12 | −7.438117E−02 | 8.741578E−02  | −2.293582E−01 | −2.513533E−02 | 1.457334E−01  | −6.588769E−02 |
| A14 | 3.796660E−02  | −3.798058E−02 | 1.061076E−01  | 2.903558E−03  | −9.463364E−02 | 4.547849E−03  |
| A16 | −8.758928E−03 | 6.165080E−03  | −1.939547E−02 | 1.505806E−03  | 2.218201E−02  | 1.362724E−03  |

|     | Eighth Surface | Ninth Surface | Tenth Surface | Eleventh Surface | Twelfth Surface | Thirteenth Surface |
| --- | --- | --- | --- | --- | --- | --- |
| k   | −1.189859E+00 | −5.455782E−01 | −1.280944E+00 | 3.633943E−01  | −1.068293E+01 | −5.405340E+00 |
| A4  | −3.567133E−02 | 2.832150E−02  | 6.567094E−02  | 6.401652E−02  | −2.209340E−01 | −1.382742E−01 |
| A6  | 4.025111E−01  | 1.250390E−01  | −1.406040E−01 | −1.068832E−01 | 1.317172E−01  | 7.484503E−02  |
| A8  | −6.890226E−01 | −1.923568E−01 | 8.264989E−02  | 4.673261E−02  | −6.274697E−02 | −3.063371E−02 |
| A10 | 6.127316E−01  | 1.482845E−01  | −3.233095E−02 | −1.119327E−02 | 1.860274E−02  | 7.817975E−03  |
| A12 | −2.927750E−01 | −5.702743E−02 | 8.447423E−03  | 1.099371E−03  | −3.039324E−03 | −1.139252E−03 |
| A14 | 7.187921E−02  | 1.076097E−02  | −1.408899E−03 | 3.671339E−05  | 2.535446E−04  | 8.625781E−05  |
| A16 | −7.188430E−03 | −8.036230E−04 | 1.100904E−04  | −1.003260E−05 | −8.482499E−06 | −2.624275E−06 |

The imaging lens in Example 2 satisfies conditional expressions (1) to (13) as shown in Table 5.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 4.20
Fno = 1.80
ω(°) = 39.4
h = 3.53
TTL = 5.45

Surface Data

| i | r | d | Nd | vd | |
| --- | --- | --- | --- | --- | --- |
| (Object) | Infinity | Infinity | | | |
| 1 (Stop) | Infinity | −0.3484851041 | | | |
| 2* | 2.0094740359 | 0.5817555763 | 1.544503 | 55.98 | (vd1) |
| 3* | 5.8725697594 | 0.2672920339 | | | |
| 4* | 3.2896675514 | 0.2486494145 | 1.661172 | 20.37 | (vd2) |
| 5* | 2.2329735534 | 0.2996267680 | | | |
| 6* | 6.3112570940 | 0.6509300561 | 1.544503 | 55.98 | (vd3) |
| 7* | −4.5672785225 | 0.2362083030 | | | |
| 8* | −1.4676797926 | 0.4726603929 | 1.614220 | 25.58 | (vd4) |
| 9* | −2.2065584324 | 0.1050268824 | | | |
| 10* | 2.0991562331 | 0.5284459645 | 1.544503 | 55.98 | (vd5) |
| 11* | 2.0384048951 | 0.3121163588 | | | |
| 12* | 1.3651903760 | 0.4965981799 | 1.534809 | 55.66 | (vd6) |
| 13* | 1.1921494944 | 0.3000000000 | | | |
| 14 | Infinity | 0.1500000000 | 1.563000 | 51.30 | |
| 15 | Infinity | 0.8525734500 | | | |
| Image Plane | Infinity | | | | |

TABLE 3-continued

Example 3
Unit mm
f = 4.20
Fno = 1.80
ω(°) = 39.4
h = 3.53
TTL = 5.45

Constituent Lens Data

| Lens | Start Surface | Focal Length | Composite Focal Length | | Lens Data substantially having no refractive power: L6 | |
|---|---|---|---|---|---|---|
| 1 | 2 | 5.327 | fl2 | 8.133 | fCNE | 9863179 |
| 2 | 4 | −11.601 | | | nCNE | 1.534809 |
| 3 | 6 | 4.971 | | | CNEr1 | 1.3651903760 |
| 4 | 8 | −9.432 | | | CNEr2 | 1.1921494944 |
| 5 | 10 | 62.593 | | | dCNE | 0.4965981799 |
| 6 | 12 | 9863179 | | | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 6.000000E+00 | −5.700000E+00 | −2.666846E+00 | −2.334299E+00 | 6.408878E+00 |
| A4 | −8.250831E−03 | −4.756115E−02 | −1.939115E−01 | −1.631997E−01 | −3.200503E−02 | −9.753019E−02 |
| A6 | 3.412558E−02 | −2.869608E−02 | 1.135272E−01 | 8.228227E−02 | −2.029252E−03 | 1.918047E−01 |
| A8 | −7.928455E−02 | 1.795710E−01 | −1.939973E−02 | 6.596426E−02 | 1.558100E−02 | −2.341745E−01 |
| A10 | 1.205479E−01 | −3.343517E−01 | −5.069967E−02 | −1.703406E−01 | −7.997239E−02 | 1.646761E−01 |
| A12 | −1.133149E−01 | 3.138071E−01 | 7.392736E−02 | 1.648079E−01 | 1.062212E−01 | −6.385484E−02 |
| A14 | 5.931944E−02 | −1.512313E−01 | −4.971009E−02 | −8.223562E−02 | −6.946830E−02 | 8.268844E−03 |
| A16 | −1.358122E−02 | 2.846696E−02 | 1.240675E−02 | 1.651310E−02 | 1.708493E−02 | 1.076993E−03 |

| | Eighth Surface | Ninth Surface | Tenth Surface | Eleventh Surface | Twelfth Surface | Thirteenth Surface |
|---|---|---|---|---|---|---|
| k | −9.480977E−01 | 1.579354E−02 | −3.167669E+00 | −2.864773E−01 | −2.716815E+00 | −3.744569E+00 |
| A4 | −1.096522E−01 | −1.491043E−01 | −7.887234E−02 | −9.498601E−02 | −2.942936E−01 | −1.644407E−01 |
| A6 | 3.753654E−01 | 2.916976E−01 | 4.804909E−02 | 4.868364E−02 | 1.912159E−01 | 9.461216E−02 |
| A8 | −4.673874E−01 | −2.788941E−01 | −4.227938E−02 | −4.065780E−02 | −8.617938E−02 | −3.975326E−02 |
| A10 | 3.693427E−01 | 1.719661E−01 | 1.451086E−02 | 1.813905E−02 | 2.315612E−02 | 1.011753E−02 |
| A12 | −1.772271E−01 | −6.247923E−02 | −9.948002E−04 | −4.690709E−03 | −3.488931E−03 | −1.459027E−03 |
| A14 | 4.776811E−02 | 1.249695E−02 | −6.283015E−04 | 6.471487E−04 | 2.743643E−04 | 1.096101E−04 |
| A16 | −5.593317E−03 | −1.076565E−03 | 1.120880E−04 | −3.656809E−05 | −8.803470E−06 | −3.326714E−06 |

The imaging lens in Example 3 satisfies conditional expressions (1) to (13) as shown in Table 5.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm
f = 4.22
Fno = 1.80
ω(°) = 39.5
h = 3.53
TTL = 5.26

Surface Data

| i | r | d | Nd | vd | |
|---|---|---|---|---|---|
| (Object) | Infinity | Infinity | | | |
| 1 (Stop) | Infinity | −0.3634396000 | | | |
| 2* | 2.0347550000 | 0.5450983000 | 1.544503 | 55.98 | (vd1) |
| 3* | 11.2138000000 | 0.1824211000 | | | |
| 4* | 6.9309270000 | 0.2000000000 | 1.661172 | 20.37 | (vd2) |
| 5* | 2.6316250000 | 0.1989023000 | | | |
| 6* | 3.8493850000 | 0.3000000000 | 1.661172 | 20.37 | (vd3) |

TABLE 4-continued

Example 4
Unit mm
f = 4.22
Fno = 1.80
ω(°) = 39.5
h = 3.53
TTL = 5.26

| | | | | | |
|---|---|---|---|---|---|
| 7* | 3.7299804000 | 0.1004208000 | | | |
| 8* | 5.0948590000 | 0.4596173000 | 1.544503 | 55.98 | (vd4) |
| 9* | −12.5224200000 | 0.7782350000 | | | |
| 10* | 17.2617100000 | 0.7633619000 | 1.544503 | 55.98 | (vd5) |
| 11* | −3.2813960000 | 0.2757561000 | | | |
| 12* | 3.2911550000 | 0.4689152000 | 1.534809 | 55.66 | (vd6) |
| 13* | 1.0505560000 | 0.5000000000 | | | |
| 14 | Infinity | 0.1500000000 | 1.516798 | 64.20 | |
| 15 | Infinity | 0.3836630000 | | | |
| Image Plane | Infinity | | | | |

Constituent Lens Data

| Lens | Start Surface | Focal Length | Composite Focal Length | | Lens Data substantially having no refractive power: L3 | |
|---|---|---|---|---|---|---|
| 1 | 2 | 4.472 | f12 | 10.192 | fCNE | 1654117148 |
| 2 | 4 | −6.538 | | | nCNE | 1.661172 |
| 3 | 6 | 1654117148 | | | CNEr1 | 3.8493850000 |
| 4 | 8 | 6.713 | | | CNEr2 | 3.7299804000 |
| 5 | 10 | 5.131 | | | dCNE | 0.3000000000 |
| 6 | 12 | −3.112 | | | | |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −8.268028E−03 | −3.235915E−02 | −1.996512E−01 | −1.919046E−01 | −4.503074E−02 | −9.357420E−02 |
| A6 | 3.697620E−02 | 2.415139E−04 | 2.388609E−01 | 1.903164E−01 | −2.267729E−02 | 1.200782E−01 |
| A8 | −7.700035E−02 | 5.269053E−02 | −2.326413E−01 | −1.438226E−01 | −2.806062E−02 | −2.471575E−01 |
| A10 | 9.599336E−02 | −8.022825E−02 | 2.651867E−01 | 7.277443E−02 | −7.649227E−02 | 2.016857E−01 |
| A12 | −7.559051E−02 | 7.606789E−02 | −2.304539E−01 | −2.439452E−02 | 1.435974E−01 | −6.791631E−02 |
| A14 | 3.792653E−02 | −3.816119E−02 | 1.042484E−01 | 3.254213E−03 | −9.576872E−02 | 3.869233E−03 |
| A16 | −8.782116E−03 | 6.185547E−03 | −1.939389E−02 | −1.540762E−03 | 2.379355E−02 | 8.767168E−04 |

| | Eighth Surface | Ninth Surface | Tenth Surface | Eleventh Surface | Twelfth Surface | Thirteenth Surface |
|---|---|---|---|---|---|---|
| k | 0.000000E+00 | 8.338731E+01 | 0.000000E+00 | 0.000000E+00 | 1.507117E+00 | −3.949105E+00 |
| A4 | −1.492243E−01 | −1.090335E−01 | 4.671484E−02 | 9.192405E−02 | −3.296910E−01 | −1.627701E−01 |
| A6 | 8.852282E−02 | 1.291266E−01 | −9.797209E−02 | −9.883991E−02 | 1.375135E−01 | 9.166222E−02 |
| A8 | −1.066496E−01 | −2.054398E−01 | 6.263808E−02 | 4.109957E−02 | −6.035826E−02 | −3.435914E−02 |
| A10 | −8.557217E−02 | 1.865652E−01 | −2.831670E−02 | −1.018395E−02 | 1.826740E−02 | 8.031753E−03 |
| A12 | 1.531813E−01 | −6.547987E−02 | 8.355180E−03 | 1.615395E−03 | −2.116929E−03 | −1.125886E−03 |
| A14 | −9.255481E−02 | 4.712124E−03 | −1.239830E−03 | 4.925847E−05 | 0.000000E+00 | 8.628685E−05 |

The imaging lens in Example 4 satisfies conditional expressions (1) to (13) as shown in Table 5.

FIG. 8 shows spherical aberration (mm), astigmatism (mm), and distortion (%) of the imaging lens in Example 4. As shown in FIG. 8, each aberration is corrected excellently.

In table 5, values of conditional expressions (1) to (13) related to Examples 1 to 4 are shown.

TABLE 5

| | Conditional Expressions | Example 1 | Example 2 | Example 3 | Example 4 |
|---|---|---|---|---|---|
| (1) | |fCNE| mm | 20887144 mm | 5523713 mm | 9863179 mm | 1654117148 mm |
| (2) | |(nCNE − 1) × (1/CNEr1 − 1/CNEr2) + (nCNE − 1) ^ 2 × dCNE/nCNE/CNEr1/CNEr2| | 4.8E−08 | 1.8E−07 | 1.0E−07 | 6.0E−10 |
| (3) | |fCNE + (−CNEr1 × dCNE/(CNEr2 − CNEr1 + dCNE))| | 2.1E+07 | 5.5E+06 | 9.9E+06 | 1.7E+09 |
| (4) | vd5 | 55.98 | 55.98 | 55.98 | 55.98 |
| (5) | (D1/f1) × 100 | 11.05 | 11.60 | 10.92 | 12.19 |

TABLE 5-continued

| | Conditional Expressions | Example 1 | Example 2 | Example 3 | Example 4 |
|---|---|---|---|---|---|
| (6) | (T1/f2) × 100 | −2.68 | −3.63 | −2.30 | −2.79 |
| (7) | |r6|/f | 0.56 | 0.97 | 1.09 | 0.88 |
| (8) | (T5/TTL) × 100 | 9.97 | 9.28 | 5.73 | 5.25 |
| (9) | T1/T2 | 1.02 | 0.96 | 0.89 | 0.92 |
| (10) | f12/f | 1.82 | 2.36 | 1.94 | 2.41 |
| (11) | r2/f | 1.74 | 2.10 | 1.40 | 2.66 |
| (12) | r5/f | 2.55 | 1.62 | 1.50 | 0.91 |
| (13) | r9/f | 0.41 | 0.61 | 0.50 | 4.09 |

When the imaging lens according to the present invention is adopted to a product with the camera function, there is realized contribution to the low profile and the low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
ih: maximum image height
IR: filter
IMG: imaging plane

What is claimed is:

1. An imaging lens comprising, in order from an object side to an image side, a first lens with positive refractive power having a convex object-side surface in a paraxial region, a second lens with negative refractive power having a concave image-side surface in a paraxial region,
a third lens having a convex object-side surface in a paraxial region,
a fourth lens having a convex image-side surface in a paraxial region,
a fifth lens with positive refractive power having a convex object-side surface in a paraxial region, and
a sixth lens having a concave image-side surface in a paraxial region,
wherein three out of four lenses from the third lens to the sixth lens have positive refractive power or negative refractive power in the paraxial region, and
one out of the four lenses is formed in a meniscus shape in the paraxial region, substantially has no refractive power in the paraxial region, and has aspheric surfaces on both sides, and the following conditional expressions (1) and (5) are satisfied:

$$1E^6 \text{ mm} < |fCNE| \text{mm} \quad (1)$$

$$8.30 < (D1/f1) \times 100 < 13.00 \quad (5)$$

where
fCNE: a focal length of a lens substantially having no refractive power,
D1: a thickness of the first lens along the optical axis, and
F1: a focal length of the first lens.

2. The imaging lens according to claim 1, wherein an image-side surface of said first lens is concave in a paraxial region.

3. The imaging lens according to claim 1, wherein an object-side surface of said sixth lens is convex in a paraxial region.

4. The imaging lens according to claim 1, wherein the following conditional expression (2) is satisfied:

$$|(nCNE-1) \times (1/CNEr1 - 1/CNEr2) + (nCNE-1)^2 \times dCNE/nCNE/CNEr1/CNEr2| < 1E^{-6} \quad (2)$$

where
|nCNE: a refractive index at d-ray of a lens substantially having no refractive power,
CNEr1: a paraxial curvature radius of an object-side surface of a lens substantially having no refractive power,
CNEr2: a paraxial curvature radius of an image-side surface of a lens substantially having no refractive power, and
dCNE: a thickness along the optical axis of a lens substantially having no refractive power.

5. The imaging lens according to claim 1, wherein the following conditional expression (3) is satisfied:

$$1E^6 < |fCNE + (-CNEr1 \times dCNE/(CNEr2 - CNEr1 + dCNE))| \quad (3)$$

where
fCNE: a focal length of a lens substantially having no refractive power,
CNEr1: a paraxial curvature radius of an object-side surface of a lens substantially having no refractive power,
CNEr2: a paraxial curvature radius of an image-side surface of a lens substantially having no refractive power, and
dCNE: a thickness along the optical axis of a lens substantially having no refractive power.

6. The imaging lens according to claim 1, wherein the following conditional expression (4) is satisfied:

$$39 < vd5 < 73 \quad (4)$$

where
vd5: an abbe number at d-ray of the fifth lens.

7. The imaging lens according to claim 1, wherein the following conditional expression (6) is satisfied:

$$-4.35 < (T1/f2) \times 100 < -2.00 \quad (6)$$

where
T1: a distance along the optical axis from an image-side surface of the first lens to an object-side surface of the second lens, and
f2: a focal length of the second lens.

8. The imaging lens according to claim 1, wherein the following conditional expression (7) is satisfied:

$$0.20 < |r6|/f < 1.55 \quad (7)$$

where
r6: a paraxial curvature radius of an image-side surface of the third lens, and f: a focal length of the overall optical system of the imaging lens.

* * * * *